(12) United States Patent
Kita et al.

(10) Patent No.: US 10,948,438 B1
(45) Date of Patent: Mar. 16, 2021

(54) X-RAY FLUORESCENCE ANALYSIS SYSTEM

(71) Applicant: Rigaku Corporation, Akishima (JP)

(72) Inventors: Hiroaki Kita, Osaka (JP); Seiitsu Kurita, Amagasaki (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/047,385

(22) PCT Filed: Mar. 28, 2019

(86) PCT No.: PCT/JP2019/013748
§ 371 (c)(1),
(2) Date: Oct. 13, 2020

(87) PCT Pub. No.: WO2019/244432
PCT Pub. Date: Dec. 26, 2019

(30) Foreign Application Priority Data

Jun. 21, 2018 (JP) .............................. JP2018-118215

(51) Int. Cl.
*G01N 21/64* (2006.01)
*G01N 23/223* (2006.01)

(52) U.S. Cl.
CPC .................... *G01N 23/223* (2013.01)

(58) Field of Classification Search
CPC .. A61K 2300/00; A61K 33/00; C12Q 1/6827; C12Q 2563/103; G01N 21/64; G01N 23/223; G01N 2223/076; G01N 2223/305; G01N 23/2252
See application file for complete search history.

(56) References Cited

U.S. PATENT DOCUMENTS

| | | | |
|---|---|---|---|
| 2007/0194234 A1 | 8/2007 | Nakada et al. | |
| 2012/0230468 A1 | 9/2012 | Sakai | |
| 2014/0286474 A1* | 9/2014 | Sakuta | G01N 23/223 378/44 |

FOREIGN PATENT DOCUMENTS

| | | |
|---|---|---|
| CN | 204101574 U | 1/2015 |
| JP | S5961779 A | 4/1984 |
| JP | S6338148 A | 2/1988 |
| JP | H05107051 A | 4/1993 |
| JP | H0934731 A | 2/1997 |

(Continued)

OTHER PUBLICATIONS

International Search Report for PCT/JP2019/013748 with English translation.

*Primary Examiner* — Don K Wong
(74) *Attorney, Agent, or Firm* — HEA Law PLLC

(57) ABSTRACT

An X-ray fluorescence spectrometric system includes: a job execution unit configured to execute a job; a storage unit configured to store in advance a time required for each of operations in association with the each of the operations; a calculation unit configured to calculate, when the job is generated, a time to be taken until execution of the job is completed, for each job based on the time stored in the storage unit; and a control unit configured to newly store, when the job is executed, a time taken for the operation in the storage unit in association with the operation. The calculation unit is configured to further calculate, when the job is executed, the time to be taken until the execution of the job is completed, based on the time newly stored in the storage unit.

7 Claims, 9 Drawing Sheets

(56) References Cited

FOREIGN PATENT DOCUMENTS

| | | | |
|---|---|---|---|
| JP | 2001338601 | A | 12/2001 |
| JP | 2010078592 | A | 4/2010 |
| JP | 2012189399 | A | 10/2012 |

* cited by examiner

FIG.3

| OPERATION ID | OPERATION | PARAMETER | PROCESSING TIME1 | PROCESSING TIME2 | ... |
|---|---|---|---|---|---|
| 0 | CONVEYANCE1 | FROM SAMPLE STORAGE DEVICE TO ALIGNER UNIT | 25 | 23 | ... |
| 1 | CONVEYANCE2 | FROM ALIGNER UNIT TO LOAD LOCK UNIT | 20 | 21 | ... |
| 2 | CONVEYANCE3 | FROM ALIGNER UNIT TO VPD UNIT | 20 | 22 | ... |
| 3 | CONVEYANCE4 | FROM VPD UNIT TO LOAD LOCK UNIT | 300 | 258 | ... |
| 4 | CONVEYANCE5 | FROM VPD UNIT TO MEASURING UNIT | 25 | 23 | ... |
| 5 | CONVEYANCE6 | FROM LOAD LOCK UNIT TO MEASURING UNIT | 20 | 19 | ... |
| 6 | CONVEYANCE7 | FROM LOAD LOCK UNIT TO SAMPLE STORAGE DEVICE | 20 | 22 | ... |
| 7 | CONVEYANCE8 | FROM MEASURING UNIT TO LOAD LOCK UNIT | 20 | 22 | ... |
| 8 | CONVEYANCE9 | BETWEEN MEASUREMENT POINTS | 100 | 100 | ... |
| 9 | VPD PROCESS1 | VAPOR PHASE DECOMPOSITION PROCESS | 240 | 208 | ... |
| 10 | VPD PROCESS2 | SCANNING COLLECTION PROCESS | 120 | 155 | ... |
| 11 | VPD PROCESS3 | DRYING PROCESS | 300 | 300 | ... |
| 12 | VPD PROCESS4 | NOZZLE CLEANING PROCESS | 180 | 180 | ... |
| 13 | MEASUREMENT1 | X-RAY MEASUREMENT | 300 | 335 | ... |
| 14 | MEASUREMENT2 | TURN ON X-RAYS | 30 | 30 | ... |
| 15 | MEASUREMENT3 | RAMP-UP | 100 | 100 | ... |
| 16 | MEASUREMENT4 | TURN OFF X-RAYS | 30 | 30 | ... |
| 17 | MEASUREMENT5 | RAMP-DOWN | 120 | 120 | ... |
| ... | ... | ... | ... | ... | ... |

FIG.4

| | RECIPE ID:1  RECIPE PROCESSING TIME:6000 | | |
|---|---|---|---|
| | RECIPE ID:0  RECIPE PROCESSING TIME:5000 | | |
| OPERATION ID | RECIPE PARAMETER1 | RECIPE PARAMETER2 | ... |
| 9(VAPOR PHASE DECOMPOSITION PROCESS) | 100 | – | ... |
| 10(SCANNING COLLECTION PROCESS) | WHOLE | – | ... |
| 11(DRYING PROCESS) | 100 | – | ... |
| 12(NOZZLE CLEANING PROCESS) | 100 | – | ... |
| ... | ... | ... | ... |
| 13(X-RAY MEASUREMENT) | X-RAY TUBE VOLTAGE(kV) | 100 | ... |
| | X-RAY TUBE CURRENT(mA) | 100 | ... |
| | EXCITATION LINE (SPECTROSCOPIC DEVICE SELECTION) | 1 | ... |
| | X-RAY IRRADIATION ANGLE (deg) | 0.5 | ... |
| | COUNT TIME | 100 | ... |
| | MEASUREMENT COORDINATES | 0, 0 | ... |
| ... | ... | ... | ... |

FIG.5

| SLOT | OPERATION ID/RECIPE ID | | PROCESSING TIME |
|---|---|---|---|
| | \multicolumn{3}{l}{JOB ID:1  JOB PROCESSING TIME:60000} |
| | \multicolumn{3}{l}{JOB ID:0  JOB PROCESSING TIME:50000} |
| 1 | OPERATION ID | 0,2,4,7 | 90 |
| 1 | RECIPE ID | 1 | 6000 |
| 2 | OPERATION ID | 5,7 | 40 |
| 2 | RECIPE ID | 2 | 2500 |
| 3 | OPERATION ID | 5,7 | 40 |
| 3 | RECIPE ID | 3 | 3500 |
| 4 | OPERATION ID | 5,7 | 40 |
| 4 | RECIPE ID | 4 | 6000 |
| ... | ... | ... | ... |
| 25 | OPERATION ID | 5,7,6 | 60 |
| 25 | RECIPE ID | 25 | 3500 |

FIG.6

| | | JOB ID:1 JOB PROCESSING TIME:60000 | | |
|---|---|---|---|---|
| | | JOB ID:0 JOB PROCESSING TIME:50000 | | |
| No. | OPERATION ID | JOB PARAMETER1 | JOB PARAMETER2 | PROCESSING TIME |
| 1 | 0(FROM SAMPLE STORAGE DEVICE TO ALIGNER UNIT) | SLOT1 | – | 25 |
| 2 | 2(FROM ALIGNER UNIT TO VPD UNIT) | – | – | 20 |
| 3 | 9(VAPOR PHASE DECOMPOSITION PROCESS) | 100 | – | 240 |
| 4 | 10(SCANNING COLLECTION PROCESS) | WHOLE | – | 120 |
| 5 | 11(DRYING PROCESS) | 100 | – | 300 |
| 6 | 12(NOZZLE CLEANING PROCESS) | 100 | – | 180 |
| 7 | 3(FROM VPD UNIT TO LOAD LOCK UNIT) | – | – | 300 |
| 8 | 4(FROM LOAD LOCK UNIT TO MEASURING UNIT) | – | – | 20 |
| 9 | 14(TURN ON X-RAYS) | – | – | 30 |
| 10 | 15(RAMP-UP) | 100 | 100 | 100 |
| 11 | 13(X-RAY MEASUREMENT) | 100 | 0,0 | 300 |
| ... | ... | ... | ... | ... |
| 27 | 17(RAMP-DOWN) | – | – | 120 |
| 28 | 16(TURN OFF X-RAYS) | – | – | 30 |
| 29 | 7(FROM MEASURING UNIT TO LOAD LOCK UNIT) | – | – | 20 |
| 30 | 6(FROM LOAD LOCK UNIT TO SAMPLE STORAGE DEVICE) | SLOT25 | – | 20 |

X-RAY FLUORESCENCE ANALYSIS SYSTEM

CROSS REFERENCE TO RELATED APPLICATIONS

This application is a National Stage of International Application No. PCT/JP2019/013748 filed on Mar. 28, 2019, which claims priority to Japanese Patent Application No. 2018-118215 filed on Jun. 21, 2018. The contents of each of the above documents are incorporated herein by reference in their entirety.

TECHNICAL FIELD

The present invention relates to an X-ray fluorescence spectrometric system.

BACKGROUND ART

Among apparatus that require a certain amount of time for completing an instructed operation, there is an apparatus configured to measure a time to be taken until the operation is completed.

For example, in Patent Literature 1, there is disclosed an X-ray spectrometer configured to measure only a specific region of a sample by moving a stage on which a sample is placed, in which, when there are a plurality of moving paths, a path that shortens a measuring time is simulated.

In Patent Literature 2, there is disclosed a scanning electron microscope having a function of calculating a measuring time from a calculated appearance rate, measurement conditions, and a number of foreign substances or defects.

In Patent Literature 3, there is disclosed an automated chemical analyzer configured to display, when measurement conditions and an instruction to start measurement are input, a time required for the measurement, and a remaining time of the measurement, based on input data.

In Patent Literature 4, there is disclosed a measuring machine configured to automatically calculate a time to be taken until completion of measurement from given measurement conditions, and display the time.

In Patent Literature 5, there is disclosed an X-ray spectrometer including: a function of calculating a measuring time and a scheduled measurement end time based on a scanning mode, a scanning range, and other such input measurement conditions; and a display unit configured to display the scheduled measurement end time based on the calculated result.

CITATION LIST

Patent Literature

[PTL 1] JP 2012-189399 A
[PTL 2] JP 2001-338601 A
[PTL 3] JP 59-061779 A
[PTL 4] JP 05-107051 A
[PTL 5] JP 63-038148 A

SUMMARY OF INVENTION

Technical Problem

The above-mentioned apparatus described in Patent Literatures 1 to 5 are each configured to calculate a time based on a time set in advance. Therefore, no consideration is given to an individual difference of an instrument and variations with time, and hence the calculated time is not an accurate time. In particular, in an X-ray fluorescence spectrometric system, for example, a time to be taken until the degree of vacuum reaches a constant value varies greatly, and a measuring time cannot be calculated accurately.

The present invention has been made in view of the above-mentioned problems, and an object thereof is to provide an X-ray fluorescence spectrometric system capable of calculating, for each X-ray fluorescence spectrometric system, an accurate measuring time that reflects a state of the X-ray fluorescence spectrometric system.

Solution to Problem

According to claim 1, there is provided an X-ray fluorescence spectrometric system, which is configured to analyze a sample through use of fluorescent X-rays generated by irradiating a surface of the sample with primary X-rays, the X-ray fluorescence spectrometric system including: a job execution unit configured to execute a job indicating a processing condition in which a recipe indicating a measurement condition formed by combining a plurality of operations required for the analysis and the sample to be measured under the measurement condition indicated by the recipe are associated with each other; a storage unit configured to store in advance a time required for each of the operations in association with the each of the operations; a calculation unit configured to calculate, when the job is generated, a time to be taken until execution of the job is completed, for each job based on the time stored in the storage unit; and a control unit configured to newly store, when the job is executed, a time taken for the operation in the storage unit in association with the operation, wherein the calculation unit is configured to further calculate, when the job is executed, the time to be taken until the execution of the job is completed, based on the time newly stored in the storage unit.

According to an X-ray fluorescence spectrometric system of claim 2, in the X-ray fluorescence spectrometric system of claim 1, the storage unit is configured to store in advance a time required for executing a series of operations included in the measurement condition indicated by the recipe in association with the recipe, and the calculation unit is configured to calculate, when the job is generated, the time to be taken until the execution of the job is completed, for each job based on the time stored in advance in association with the recipe. Further, the control unit is configured to newly store, when the series of operations included in the measurement condition indicated by the recipe are executed, the time to be taken for executing the series of operations in the storage unit in association with the recipe, and the calculation unit is configured to further calculate, when the measurement condition indicated by the recipe is executed, the time to be taken until the execution of the job is completed, based on the time newly stored in the storage unit.

According to an X-ray fluorescence spectrometric system of claim 3, in the X-ray fluorescence spectrometric system of claim 2, the job includes one or a plurality of jobs stored in the storage unit, and the control unit is configured to store, when the stored job is duplicated to generate a new job, the time associated with the job being a duplication source, in the storage unit in association with the new job.

According to an X-ray fluorescence spectrometric system of claim 4, in the X-ray fluorescence spectrometric system of claim 3, the control unit is configured to further evaluate, when the duplicated job is modified, a degree of modification, and perform, based on the evaluation, control as to whether a time obtained by adding correction corresponding to the modification to the time associated with the job being the duplication source is to be stored in the storage unit or whether a time calculated based on the time stored in advance in association with the recipe and details of the modified job is to be stored in the storage unit.

According to an X-ray fluorescence spectrometric system of claim 5, in the X-ray fluorescence spectrometric system of any one of claims 1 to 4, the calculation unit is configured to calculate the time to be taken until the execution of the job is completed, based on a median value of a plurality of times stored most recently in the storage unit.

According to an X-ray fluorescence spectrometric system of claim 6, in the X-ray fluorescence spectrometric system of any one of claims 1 to 4, the calculation unit is configured to calculate the time to be taken until the execution of the job is completed, based on an average value of a plurality of times stored most recently in the storage unit.

According to an X-ray fluorescence spectrometric system of claim 7, the X-ray fluorescence spectrometric system of any one of claims 1 to 6 further includes a display unit configured to display the time to be taken until the execution of the job is completed.

Advantageous Effects of Invention

According to the inventions of claims 1, 2, 5, and 6, it is possible to calculate, for each X-ray fluorescence spectrometric system, an accurate measuring time that reflects the state of the X-ray fluorescence spectrometric system. In addition, for example, when this X-ray fluorescence spectrometric system is incorporated in a production line, it is possible to improve production efficiency by reducing a waiting time of another apparatus included in the production line.

According to the inventions of claims 3 and 4, it is possible to calculate an accurate measuring time when a job is newly generated.

According to the invention of claim 7, a user can easily recognize the measuring time.

BRIEF DESCRIPTION OF DRAWINGS

FIG. 3 is a diagram for illustrating an example of an operation table.

FIG. 4 is a diagram for illustrating an example of a recipe table.

FIG. 5 is a diagram for illustrating an example of a job management table.

FIG. 6 is a diagram for illustrating an example of a job table.

DESCRIPTION OF EMBODIMENTS

Figure 1:
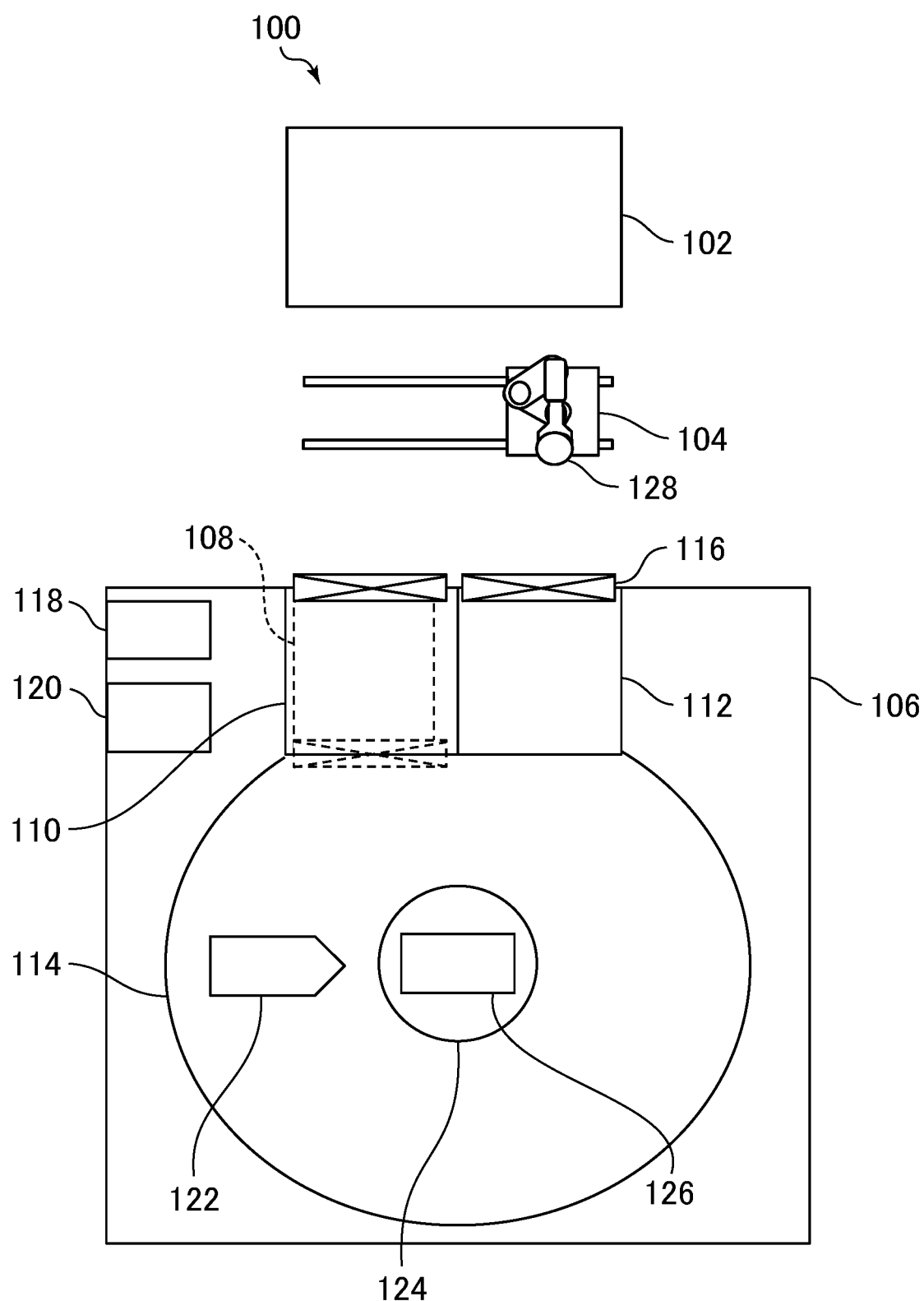
FIG. 1 is a diagram for schematically illustrating an X-ray fluorescence spectrometric system according to an embodiment of the present invention.

Now, a preferred embodiment for carrying out the present invention (hereinafter referred to as "embodiment") will be described by taking a VPD-integrated total reflection X-ray fluorescence spectrometer as an example. FIG. 1 is a diagram for schematically illustrating an X-ray fluorescence spectrometric system 100 according to the present embodiment.

The X-ray fluorescence spectrometric system 100 includes a sample storage device 102, a conveying device 104, and an X-ray fluorescence spectrometer 106. The X-ray fluorescence spectrometer 106 includes a load lock unit 108, an aligner unit 110, a vapor phase decomposition (VPD) unit 112, a measuring unit 114, shutters 116, an information processing unit 118, and a display unit 120.

The sample storage device 102 is configured to store a sample 128 to be measured. Specifically, for example, a carrier is arranged in the sample storage device 102. The carrier is, for example, storage equipment configured to store one lot of samples 128, and is arranged inside the sample storage device 102. As the carrier, for example, 25 samples 128 of Si substrates are arranged in one lot. The sample storage device 102 stores, for example, carriers corresponding to two lots.

The conveying device 104 is configured to convey the sample 128 to be measured. Specifically, for example, the conveying device 104 includes a seat portion having a variable height, a rail portion configured to move the seat portion, a hand portion on which the sample 128 is to be placed, and a stretchable portion configured to expand and contract. When the seat portion, the rail portion, and the stretchable portion operate, the conveying device 104 conveys the sample 128 between the sample storage device 102 and the X-ray fluorescence spectrometer 106.

The conveying device 104 may be further arranged inside the X-ray fluorescence spectrometer 106. The conveying device 104 arranged inside the X-ray fluorescence spectrometer 106 conveys the sample 128 among the load lock unit 108, the aligner unit 110, the VPD unit 112, and the measuring unit 114.

The load lock unit 108 is configured to change an environment in which the sample 128 is placed from vacuum to atmospheric pressure or from atmospheric pressure to vacuum. Specifically, for example, the sample 128 is conveyed from the aligner unit 110 or the VPD unit 112 to the measuring unit 114 via the load lock unit 108. The load lock unit 108 discharges air from the inside of the load lock unit 108 by using a vacuum pump (not shown) to place the sample 128 under a vacuum environment. In addition, the load lock unit 108 introduces air into the load lock unit 108 before the sample 128 is conveyed from the load lock unit 108 to the sample storage device 102, to thereby place the sample 128 under an atmospheric pressure environment.

The aligner unit 110 is configured to perform position alignment of the sample 128. Specifically, the aligner unit 110 adjusts a positional relationship between a seat of the aligner unit 110 and the sample 128 so as to prevent a liquid droplet collecting position in a VPD process from being shifted.

The VPD unit 112 is a device configured to collect an object to be measured contained in the sample 128. Specifically, for example, a case in which the sample 128 includes impurities, being an object to be measured, and a substrate having a surface to which the impurities adhere, is described.

First, the VPD unit 112 is exposed to a gas that dissolves the impurities and other substances adhering to a surface of the substrate to dissolve impurities and other substances. Then, the VPD unit 112 drops a liquid droplet from a nozzle onto the substrate, and moves the dropped liquid droplet on the surface of the substrate to take the object to be measured into the liquid droplet. Subsequently, the VPD unit 112 collects the object to be measured into the liquid droplet, and then separates the liquid droplet from the nozzle at a preset position on the substrate. Thus, the liquid droplet into which the object to be measured has been taken is left at a predetermined position on the substrate. The object to be measured can be collected not only from the entire surface of the substrate but also from a designated portion of the substrate surface or a bevel portion (edge portion of the substrate). Subsequently, the VPD unit 112 dries the liquid droplet to hold the object to be measured on the surface of the substrate.

Thus, the object to be measured adhering to the surface of the substrate can be collected in one place. The VPD process enables the X-ray fluorescence analysis to be performed even with a small amount of the object to be measured. The VPD unit 112 includes a vapor phase decomposition portion configured to perform vapor phase decomposition and a liquid droplet collecting portion configured to collect a liquid droplet, but is simplified in the illustration of FIG. 1.

The measuring unit 114 is configured to analyze the sample 128 through use of fluorescent X-rays generated by irradiating the surface of the sample 128 with primary X-rays at a minute angle equal to or smaller than a total reflection critical angle. Specifically, the measuring unit 114 includes an X-ray source 122, a sample stage 124, and a detector 126.

The X-ray source 122 is configured to irradiate the surface of the sample 128 with primary X-rays for generating fluorescent X-rays. The sample 128 to be measured is placed on the sample stage 124. The sample stage 124 is configured to perform position alignment of the sample 128. The detector 126 is, for example, a Si (Li) detector or an SDD. The detector 126 is arranged on the sample 128 (front side when viewing the drawing). For example, the detector 126 measures an intensity of the fluorescent X-ray to output a pulse signal having a pulse height corresponding to the measured energy of the fluorescent X-rays. Then, the output from the detector 126 is counted by a multi-channel analyzer or another such counter (not shown) based on the pulse height. In addition, an analysis unit (not shown) quantitatively analyzes elements contained in the sample 128 from a counting result of the counter by a calibration curve method or a fundamental parameter (FP) method.

The shutters 116 are arranged at boundaries between the respective components. Specifically, the shutters 116 are arranged on a surface of the load lock unit 108 facing the conveying device 104, on a surface of the VPD unit 112 facing the conveying device 104, and at a boundary between the load lock unit 108 and the measuring unit 114. The shutters 116 are each opened at a time when the sample 128 is conveyed between the components. Thus, the measuring unit 114 is maintained in a vacuum state. In addition, the gas inside the VPD unit 112 is prevented from flowing into the aligner unit 110 or the load lock unit 108.

The information processing unit 118 is configured to control an operation of each of the components of the X-ray fluorescence spectrometer 106. Specifically, for example, the information processing unit 118 is a personal computer (PC), and controls, for example, the operation of the measuring unit 114 and opening or closing of the shutters 116.

Figure 2:
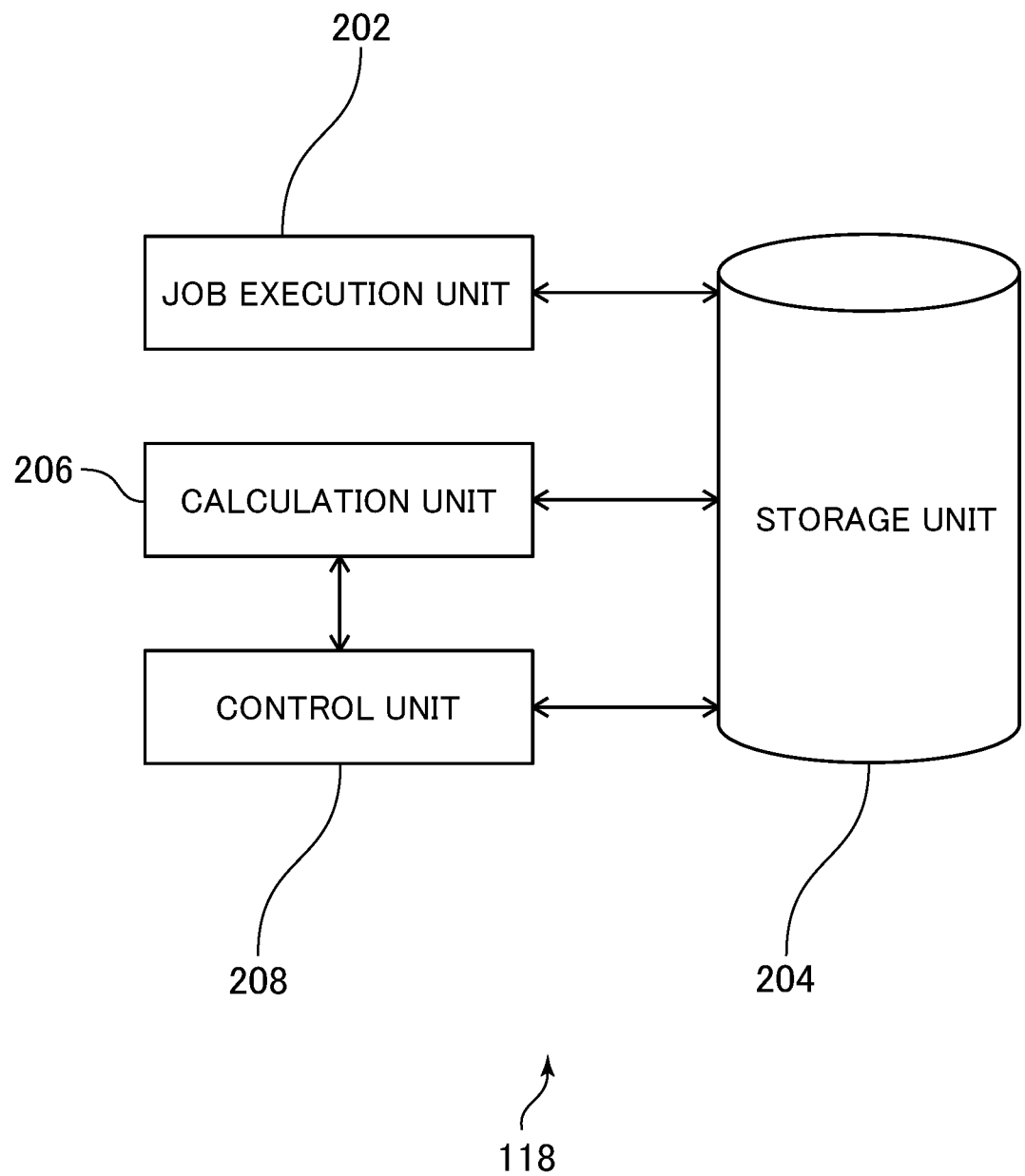
FIG. 2 is a diagram for illustrating a functional configuration of an information processing unit.

FIG. 2 is a block diagram for illustrating a functional configuration of the information processing unit 118. The information processing unit 118 includes a job execution unit 202, a storage unit 204, a calculation unit 206, and a control unit 208.

The job execution unit 202 is configured to execute a job. Specifically, the job execution unit 202 executes a job indicating a processing condition in which a recipe indicating a measurement condition formed by combining a plurality of operations required for analysis and the sample 128 to be measured under the measurement condition indicated by the recipe are associated with each other.

The job is an execution condition of a series of processes in which one or a plurality of samples 128 designated as targets to be measured in a carrier, and a recipe indicating the measurement condition for each sample 128, are associated with each other. One or a plurality of jobs are stored in the storage unit 204. The recipe is, for example, a measurement condition for a VPD process and X-ray measurement as shown in FIG. 4.

The storage unit 204 is configured to store in advance a time required for each operation in association with each operation. Specifically, the storage unit 204 is, for example, a main storage unit (for example, RAM) and an auxiliary storage unit (for example, nonvolatile semiconductor memory, hard disk drive, or solid state drive). The storage unit 204 is also configured to store programs and various tables described later.

FIG. 3 is a diagram for illustrating an example of an operation table stored in the storage unit 204. As shown in FIG. 3, the operation table includes an operation ID field, an operation field, a parameter field, and a processing time field. The processing time field includes at least a processing time 1 field, and includes a processing time 2 field to a processing time n field depending on the state of the X-ray fluorescence spectrometer 106.

The operation ID field indicates information for uniquely identifying each operation. For example, as shown in FIG. 3, an operation ID corresponding to conveyance 1 is "0", and an operation ID corresponding to a VPD process 1 is "9".

The operation field indicates a higher category of operations to be executed by the X-ray fluorescence spectrometric system 100. Specifically, in FIG. 3, the conveyance 1 to conveyance 8 indicate operations for conveying the sample 128 between the sample storage device 102, the load lock unit 108, the aligner unit 110, the VPD unit 112, and the measuring unit 114. Conveyance 9 indicates an operation for moving the sample 128 between measurement points. The VPD process 1 to VPD process 4 indicate operations for exposing the sample 128 to a gas to dissolve and collect the sample 128. Measurement 1 to measurement 5 indicate each operation to be executed by the measuring unit 114 in order to analyze the elements contained in the sample 128.

The parameter field indicates a lower category of operations to be executed by the X-ray fluorescence spectrometric system 100. Specifically, as shown in FIG. 3, a parameter field associated with the "conveyance 1" indicates "from sample storage device 102 to aligner unit 110". In this manner, a parameter field associated with the "conveyance 2" indicates "from aligner unit 110 to load lock unit 108". A parameter field associated with the "conveyance 3" indicates "from aligner unit 110 to VPD unit 112". A parameter field associated with the "conveyance 4" indicates "from VPD unit 112 to load lock unit 108". A parameter field associated with the "conveyance 5" indicates "from VPD unit 112 to measuring unit 114". A parameter field associated with the "conveyance 6" indicates "from load lock unit 108 to measuring unit 114". A parameter field associated with the "conveyance 7" indicates "from load lock unit 108 to sample storage device 102". A parameter field associated with the "conveyance 8" indicates "from measuring unit 114 to load lock unit 108". A parameter field associated with the "conveyance 9" indicates "between measurement points".

In this case, the respective parameters associated with the "conveyance 1" to the "conveyance 8" indicate starting points and ending points at the time of conveyance. In addition, the parameter associated with the "conveyance 9" indicates that the conveyance is to be performed from one measurement point to another measurement point when there are a plurality of measurement positions for one sample 128.

A parameter field associated with the "VPD process 1" indicates a vapor phase decomposition process for exposing the sample 128 to a gas for dissolving the sample 128 to dissolve the sample 128. A parameter field associated with the "VPD process 2" indicates a scanning collecting process for dropping a liquid droplet from the nozzle onto the substrate and moving the dropped liquid droplet on the surface of the substrate to take an object to be measured into the liquid droplet. A parameter field associated with the "VPD process 3" indicates a drying process for drying the liquid droplet to hold the sample 128 on the surface of the substrate. A parameter field associated with the "VPD process 4" indicates a process for cleaning the nozzle used for collecting the sample 128.

A parameter field associated with the "measurement 1" indicates an X-ray measurement to be performed at a designated position on the sample 128. A parameter field associated with the "measurement 2" indicates a process for powering on the X-ray source 122. A parameter field associated with the "measurement 3" indicates an aging process (ramp-up) for stepwise maximal (set) power, which is performed after the X-ray source 122 is powered on. A parameter field associated with the "measurement 4" indicates a process for powering off the X-ray source 122. A parameter field associated with the "measurement 5" indicates a process (ramp-down) for stepwise reducing the power of the X-ray source 122 to minimum power.

Information that combines the operation field and the parameter field is information indicating details of the operation associated with each operation ID. The storage unit 204 may also store the operation field and the parameter field as one field.

The processing time field indicates a processing time, being a time required for each operation. Specifically, the processing time 1 field indicates a time stored in advance in association with each operation. For example, a processing time of "25" is stored in advance as a design value in association with an operation ID of "0". This indicates that a value of 25 seconds is set in advance as a time required for the conveyance from the sample storage device 102 to the aligner unit 110. The time set in advance may also be an actual value at the time of a test operation.

In addition, the processing time 2 field to the processing time n field each indicate an actual value of a time taken for the operation when the operation is performed. For example, it is assumed that 23 seconds are taken when the operation of conveyance from the sample storage device 102 to the aligner unit 110, which corresponds to the operation ID of "0", is executed. In this case, a value of "23" is stored in the processing time 2 field in association with the operation ID of "0".

The times stored in each of the processing time 2 field to the processing time n field are times including a time required for a process accompanying the operation. For example, the opening or closing of the shutter 116, evacuation, or another such process may be performed in accompaniment with the operation of conveyance. In this case, the processing time field stores an operation processing time including a time taken for the process. In particular, an evacuation time may vary greatly between when the X-ray fluorescence spectrometric system 100 is initially set at the time of manufacture and when the X-ray fluorescence spectrometric system 100 is installed in an actual place of use, depending on, for example, vacuum piping and its arrangement. In addition, the evacuation time may vary greatly depending on the degree of aging and depending on before or after maintenance.

The processing time field may have a value added every time the X-ray fluorescence spectrometric system 100 executes each operation in the operation table. The processing time field may also have a value added every time the X-ray fluorescence spectrometric system 100 executes each operation in the operation table a plurality of times. The processing time field may also be increased as the requirement arise. In another case, when the number of processing time fields reaches a predetermined number, the number may be inhibited from being increased more than the predetermined number. In this case, after the number of processing time fields reaches the predetermined number, the actual values are overwritten and stored in order from the oldest processing time field.

Further, there may be a plurality of operation IDs associated with the operation of X-ray measurement. Specifically, when a plurality of recipes, which will be described later, are created, a time required for executing the operation of X-ray measurement varies depending on the measurement condition indicated by each recipe. Therefore, when n recipes are created, values of "X-ray measurement 1", "X-ray measurement 2", (omitted), and "X-ray measurement n" may be set in the parameter field. In the processing time field associated with each parameter field, a time corresponding to the measurement condition indicated by the corresponding recipe is set.

The storage unit 204 further stores a time required for executing a series of operations included in a measurement condition indicated by a recipe, in association with the recipe. Specifically, for example, the storage unit 204 stores a recipe table shown in FIG. 4.

FIG. 4 is a diagram for illustrating an example of the recipe table stored in the storage unit 204. Each recipe table is stored in association with a unique recipe ID and a recipe processing time, described later. The recipe table also includes an operation ID field and a plurality of recipe parameter fields. Each value set in the operation ID field and the plurality of recipe parameter fields is set by a user inputting each value on a recipe creation screen 700 described later.

In this case, the measurement condition indicated by the recipe includes each operation required for the X-ray measurement, but does not include the operation for conveying the sample 128. In addition, when the VPD process is designated to be performed, the measurement condition indicated by the recipe includes each operation of the VPD process and each operation relating to the X-ray measurement.

A measurement operation may include not only an operation for measuring an intensity of the fluorescent X-rays generated by irradiating the sample 128 with X-rays but also a center intensity correction measurement operation. The center intensity correction measurement operation is an operation in which an inclination of a wafer surface at each measurement point is adjusted by an angle of a stage to cause the intensity of the fluorescent X-rays from the substrate to match an intensity set as a reference. Even when there is, for example, a bend on the surface of the sample 128, the influence thereof can be corrected by the center intensity correction measurement operation.

The operation ID field indicates an operation ID associated with an operation including a measurement condition set by the user. Specific examples of an operation relating to vapor phase decomposition include a vapor phase decomposition process, a scanning collection process, a drying process, and a nozzle cleaning process. Therefore, in the operation ID field, operation IDs of "9" to "12" associated with the operation are set.

In addition, in order to execute the operation of X-ray measurement, it is required to set an X-ray tube voltage, an X-ray tube current, and other such conditions. Therefore, in the operation ID field, an operation ID of "13" associated with the operation is set. An operation ID other than the above-mentioned operation ID may be set in the operation ID field of the recipe table.

The recipe parameter field is information set by the user in regard to each operation. Specifically, for example, when the user sets a vapor phase decomposition process time to "100" seconds, a value of "100" is set in a recipe parameter 1 field in association with the operation ID of "9". When the user sets a range for performing scanning collection in the VPD process to a whole range, a value of "whole" is set in the recipe parameter 1 field in association with the operation ID of "10". When the user sets the drying process time to "100" seconds, the value of "100" is set in the recipe parameter 1 field in association with the operation ID of "11". When the user sets the nozzle cleaning process time to "100" seconds, the value of "100" is set in the recipe parameter 1 field in association with the operation ID of "12".

In addition, one operation ID set in the operation ID field may be associated with a plurality of recipe parameter fields. The recipe table may also include the recipe parameter 1 field to a recipe parameter n field. Specifically, for example, as shown in FIG. 4, values of "X-ray tube voltage (kV)" and "X-ray tube current (mA)" in the recipe parameter 1 field may be associated with the operation ID of "13 (X-ray measurement)".

In this case, for example, when the user sets the X-ray tube voltage to "100" kV, the value of "100" is set in a recipe parameter 2 field in association with the "X-ray tube voltage (kV)" in the recipe parameter 1 field. When the user sets the X-ray tube current to "100" mA, the value of "100" is set in the recipe parameter 2 field in association with the "X-ray tube current (mA)" in the recipe parameter 1 field.

In the same manner, for example, values of "excitation line (spectroscopic device selection)", "X-ray irradiation angle (deg)", "count time", and "measurement coordinates" in the recipe parameter 1 field may also be associated with the operation ID of "13 (X-ray measurement)".

Specifically, for example, it is assumed that the measuring unit 114 includes n spectroscopic devices, and that the values of "1" to "n" are associated with the respective spectroscopic devices. When the user selects the spectroscopic device associated with "1", the value of "1" is set in the recipe parameter 2 field in association with "excitation line (spectroscopic device selection)" in the recipe parameter 1 field.

In addition, when the user sets an irradiation angle of the X-rays to "0.5" degrees, a value of "0.5" is set in the recipe parameter 2 field in association with "X-rays irradiation angle (deg)" in the recipe parameter 1 field. When the user sets the count time to "100" seconds, the value of "100" is set in the recipe parameter 2 field in association with "count time" in the recipe parameter 1 field. In this case, the count time is a time for counting the number of fluorescent X-rays detected by the detector 126.

When the user sets a measurement position on the sample in an xy-coordinate system to "0, 0", values of "0, 0" are set in the recipe parameter 2 field in association with "measurement coordinates" in the recipe parameter 1 field. It is assumed that the center of the substrate corresponds to a recipe parameter 2 of "0, 0" (in which the x-coordinate and the y-coordinate are each assumed to be "0" in the xy-coordinate system). In addition, when the user sets a plurality of sets of measurement coordinates, a value indicating the set coordinates is set in each of the recipe parameter 3 field and the subsequent fields in association with "measurement coordinates" in the recipe parameter 1 field.

The recipe processing time is calculated by the calculation unit 206 based on the value of the recipe parameter field set by the user. Specifically, the calculation unit 206 calculates, based on each measurement condition included in the recipe table and each processing time included in the operation table, a time required for executing the measurement condition indicated by the recipe. Only one recipe processing time is shown for one recipe in FIG. 4, but a plurality of recipe processing times may be provided. As described later, the recipe processing time is added when a job is executed.

The storage unit 204 further stores a job management table for managing each job. FIG. 5 is a diagram for illustrating an example of the job management table stored in the storage unit 204. As shown in FIG. 5, each job management table is stored in association with a unique job ID and a job processing time, described later. The job ID indicates information for uniquely identifying each job. The job management table also includes a slot field, an operation ID/recipe ID field, and a processing time field.

The slot field indicates a number of a slot in which the sample 128 to be measured is placed. Specifically, for example, a case in which the carrier arranged inside the sample storage device 102 has 25 slots is described. When the user specifies that the measurement is to be performed by sequentially exchanging the samples 128 placed in the slots 1 to 25, the values of "1", "2", "3", "4", . . . , "25" are set in the slot field from the top.

An operation ID field indicates an operation ID for identifying an operation to be executed on the sample 128 placed in the corresponding slot. In the operation ID field, the operation ID indicating an operation mainly relating to the conveyance of the sample 128 is set.

A recipe ID field indicates a recipe ID associated with a measurement condition to be executed on the sample 128 placed in the corresponding slot. The designated recipe ID is set in the recipe ID field when the user designates the recipe ID on a job creation screen 800, described later.

Specifically, a case in which the samples 128 placed in the slots numbered "1" to "25" are sequentially analyzed based on the recipes associated with the recipe IDs of "1" to "25", respectively, is described. In addition, it is assumed that the measurement conditions indicated by the recipes associated with the recipe IDs of "1" and "4" include the measurement conditions relating to the VPD process and the X-ray measurement. It is also assumed that the measurement conditions indicated by the recipes associated with the recipe IDs of "2", "3", and "25" do not include the VPD process but include only the measurement condition relating to the X-ray measurement.

In this case, the sample 128 placed in the slot numbered "1" is sequentially subjected to the conveyance from the sample storage device 102 to the aligner unit 110 (operation ID of "0"), the conveyance from the aligner unit 110 to the VPD unit 112 (operation ID of "2"), the VPD process, the conveyance from VPD unit 112 to measuring unit 114 (operation ID of "4"), the X-ray measurement, the conveyance from the measuring unit 114 to the load lock unit 108 (operation ID of "7"), and the conveyance from the load lock unit 108 to the sample storage device 102 (operation ID of "6").

In this case, when the conveyance from the load lock unit 108 to the sample storage device 102 (operation ID of "6") is performed, the respective operations are performed in parallel on the sample 128 placed in the slot numbered "2". Therefore, the operation IDs indicating the operations independently executed on the sample 128 placed in the slot numbered "1" are "0, 2, 4, 7".

Therefore, the values of "0, 2, 4, 7" associated with the operations required for performing the VPD process and the X-ray measurement are set in the operation ID field in association with the slot number of "1". In addition, the value of "1" is set in the recipe ID field in association with the slot number of "1".

In the same manner, the sample 128 placed in the slot numbered "2" is subjected to the conveyance from the sample storage device 102 to the load lock unit 108, the conveyance from the load lock unit 108 to the measuring unit 114, the X-ray measurement, the conveyance from the measuring unit 114 to the load lock unit 108, and the conveyance from the load lock unit 108 to the sample storage device 102.

In this case, when the conveyance from the sample storage device 102 to the load lock unit 108 is performed, the respective operations are performed in parallel on the sample 128 placed in the slot numbered "1". In addition, when the conveyance from the load lock unit 108 to the sample storage device 102 is performed, the respective operations are performed in parallel on the sample 128 placed in the slot numbered "3". Therefore, the operation IDs indicating the operations independently executed on the sample 128 placed in the slot numbered "2" are "5, 7".

Therefore, the values of "5, 7" associated with the operations required for performing the X-ray measurement are set in the operation ID field in association with the slot number of "2". In addition, the value of "2" is set in the recipe ID field in association with the slot number of "2".

In the same manner, the operation ID indicating the operation independently executed on the sample 128 placed in each of the slots numbered "3" to "25" is set in the operation ID field in association with the number of each slot. Specifically, the values of "5, 7" associated with the operations required for performing the X-ray measurement are set in the operation ID field in association with the slot number of "3". In addition, the value of "3" is set in the recipe ID field in association with the slot number of "3".

Further, the values of "5, 7" associated with the operations required for performing the VPD process and the X-ray measurement are set in the operation ID field in association with the slot number of "4". In addition, the value of "4" is set in the recipe ID field in association with the slot number of "4".

Further, the values of "5, 7, 6" associated with the operations required for performing the X-ray measurement are set in the operation ID field in association with the slot number of "25". In addition, the value of "25" is set in the recipe ID field in association with the slot number of "25". The sample 128 placed in the slot numbered "25" is independently subjected to the conveyance from the load lock unit 108 to the sample storage device 102 (operation ID of "6"), and hence the value of "6" is set in the operation ID field.

The processing time field indicates a time required for executing the operation or measurement condition indicated by the associated operation ID or recipe ID, respectively. Specifically, the calculation unit 206 calculates, based on the operation table, the time required for executing the operation indicated by a value set in the operation ID field. Meanwhile, the calculation unit 206 calculates, based on the operation table, the time required for executing the measurement condition indicated by a value set in the recipe ID field.

For example, values of "25", "20", "25", and "20" are set in the processing time 1 field in association with the operation IDs of "0, 2, 4, 7" included in the operation table. Therefore, a value of "90" is set in the processing time field in association with the operation IDs of "0, 2, 4, 7" corresponding to the slot number of "1". A value of "6000" is set in the processing time field in association with the recipe ID of "1" corresponding to the slot number of "1". In the same manner, a value obtained by summing up the times required for the respective operations or measurement conditions is set in association with each of the slot numbers of "2" to "25".

The job processing time indicates a time required for executing a corresponding job. Specifically, the job processing time associated with a job ID is a time obtained by summing up values of the processing time field included in the job management table. For example, the job processing time associated with the job ID of "0" is "50000".

The storage unit 204 further stores a job table associated with each job. The job table is automatically generated by the control unit 208 when a job is generated by the user. The job table is a table in which operations to be performed when each job is executed are shown in the order in which the operations are to be executed. FIG. 6 is an example of the job table stored in the storage unit 204.

As shown in FIG. 6, the job table includes a No. field, an operation ID field, job parameter fields, and a processing time field. Now, with reference to FIG. 6, a case in which measurement conditions indicated by recipes associated with the recipe IDs of "1" to "25" are sequentially executed on the samples 128 placed in the slots numbered "1" to "25" will be described.

The No. field indicates the execution order position of each operation included in a job. Specifically, an operation corresponding to "1" in the No. field is executed first when the job is executed. When the X-ray measurement is continuously performed on the plurality of samples 128, a plurality of operations corresponding to a plurality of No. fields may be executed in parallel.

The operation ID field is the same as the operation ID field included in the operation table. The job parameter fields are the same as the recipe parameter fields included in the recipe table. The operation IDs associated with the operations to be sequentially executed are set in the operation ID field with reference to the job management table and the recipe table. In the same manner, the values of the recipe parameter fields associated with the operation ID are set in the job parameter fields with reference to the job management table and the recipe table.

Specifically, operations corresponding to "1" and "2" in the No. field shown in FIG. 6 are carry-in operations. Operations corresponding to "3" to "6" and "9" to "11" in the No. field are operations included in the measurement condition indicated by the recipe. The operations corresponding to "3" to "6" in the No. field are operations relating to the VPD process. The operations corresponding to "9" to "11" in the No. field are operations relating to the X-ray measurement. Operations corresponding to "27" and "28" in the No. field are the ramp-down operation and the operation for powering off the X-ray source 122. Operations corresponding to "29" and "30" in the No. field are carry-out operations.

The processing time field indicates a time required for executing the operation indicated by the associated operation ID. Values of the processing time fields are set based on the associated operation ID and the operation table shown in FIG. 3.

Now, referring back to FIG. 2, when a job is generated, the calculation unit 206 calculates a time to be taken until the execution of the job is completed, for each job, based on the times stored in advance in the storage unit 204. Specifically, for example, the description is given on the assumption that the job table shown in FIG. 6 has been generated. In this case, the calculation unit 206 calculates the time required for executing the job by summing up the values of the processing time field included in the job table. The calculated value is stored in the storage unit 204 as the value of the job processing time field in the job management table shown in FIG. 5.

In this case, as described above, a plurality of operations corresponding to a plurality of No. fields may be executed in parallel. Therefore, when there are operations to be executed in parallel, the calculation unit 206 may calculate the job processing time by including only the processing time associated with one of the operations in the time required for executing the job. With this method, a more accurate job processing time can be calculated.

Specifically, the job management table includes operations required for carrying in the sample 128 (hereinafter referred to as "carry-in operation"), each operation included in the measurement condition indicated by the recipe, and operations required for carrying out the sample 128 (hereinafter referred to as "carry-out operation").

When there are a plurality of samples 128 to be measured, it is required to consider the time for conveying the first sample 128 from the sample storage device 102 to the aligner unit 110. However, each of the second and subsequent samples 128 is conveyed from the sample storage device 102 to the aligner unit 110 while the previous sample 128 is being measured. Therefore, the calculation unit 206 calculates the job processing time without consideration being given to the time required for carrying in the second and subsequent samples 128.

It is also required to consider the time for the last sample 128 to be conveyed from the load lock unit 108 to the sample storage device 102. However, the samples 128 other than the last sample 128 are conveyed from the load lock unit 108 to the sample storage device 102 while the subsequent sample 128 is being measured. Therefore, the calculation unit 206 calculates the job processing time, except for the last sample 128, without consideration being given to the time required for the carry-out. This enables the calculation unit 206 to calculate an accurate job processing time. A value to which consideration is given so that the above-mentioned processing time of the operations to be executed in parallel is not included in the job processing time is set in the processing time field included in the job management table shown in FIG. 5.

The control unit 208 includes at least one microprocessor (CPU), and is configured to execute a job. The control unit 208 is further configured to newly store in the storage unit 204, when the job is executed, the time taken for the operation, in association with the operation. Specifically, the control unit 208 measures the time taken for each of the executed operations in accordance with a program for measurement, which is stored in the storage unit 204. The control unit 208 executes a process for adding the measured time to the processing time field included in the operation table.

For example, it is assumed that the carry-in operation (operation ID of "0"), each of the operations included in the measurement condition indicated by the recipe having the recipe ID of "0", and the carry-out operation (operation ID of "6") have been executed. It is assumed that the control unit 208 has measured that the times taken for the carry-in operation, all the operations included in the measurement condition indicated by the recipe, and the carry-out operation, are 23 seconds, 5,000 seconds, and 22 seconds, respectively.

The control unit 208 adds the value of "23" to the processing time 2 field corresponding to the carry-in operation (processing time 2 field corresponding to the operation having the operation ID of "0") in the operation table. The control unit 208 adds the measured value for each operation ID of each of the operations included in the measurement condition indicated by the recipe ID of "0". The control unit 208 adds a value of "22" to the processing time 2 field corresponding to the carry-out operation (processing time 2 field corresponding to the operation having the operation ID of "6") in the operation table.

The control unit 208 may add a value to the above-mentioned processing time field every time each operation is executed, or may add a value to the above-mentioned processing time field every time an operation is executed a plurality of times. In addition, the control unit 208 may add the recipe processing time every time a job is executed, or may add the above-mentioned recipe processing time every time a job is executed a plurality of times.

The control unit 208 may further update or add the recipe processing time included in the recipe table. In the above-mentioned case, the control unit 208 may add a recipe processing time of "5000" to the recipe table in association with the recipe ID of "0".

The control unit 208 may also add or update the processing time field and the job processing time that are included in the job management table based on the value set in the processing time 2 field of the operation table. The control unit 208 may update or add the value of the processing time field included in the job table based on the value set in the processing time 2 field of the operation table.

The calculation unit 206 may further calculate, when each operation included in the measurement condition indicated by the recipe is executed, a time to be taken until the job execution is completed, based on the time stored newly in the storage unit 204. Specifically, the values of the processing time field included in the updated job management table are summed up to calculate the time to be taken until the execution of the job is completed. That is, the calculation unit 206 calculates the time to be taken until the execution of the job is completed, based on the actual value of the processing time of each operation.

When there is one past actual value, the value calculated by the calculation unit 206 as described above is the same as the past actual value. When there are a plurality of past actual values, the calculation unit 206 may calculate the value based on the past plurality of actual values.

Specifically, the calculation unit 206 may calculate the time to be taken until each operation is completed, based on an average value of a plurality of times stored most recently in the storage unit 204. For example, the calculation unit 206 may calculate the time to be taken until the execution of the job is completed, based on the average value of the past five actual values.

In addition, in order to exclude an actual value that accidentally deviates significantly, the calculation unit 206 may calculate the time to be taken until each operation is completed, based on a median value of the plurality of times stored most recently in the storage unit 204. For example, the calculation unit 206 may calculate the time to be taken until the execution of the job is completed, based on a median value of the past three actual values.

The storage unit 204 may store in advance the time required for executing a series of operations included in the measurement condition indicated by the recipe, in association with the recipe. When a job is generated, the calculation unit 206 may calculate the time to be taken until the execution of the job is completed, for each job based on the time stored in advance in association with the recipe. Specifically, for example, the calculation unit 206 may use the processing time included in the job table shown in FIG. 5 to calculate the time to be taken until the execution of the job is completed.

Specifically, for example, it is assumed that the job table shown in FIG. 6 has been generated based on the job management table shown in FIG. 5. In this case, the calculation unit 206 calculates the job processing time included in the job management table shown in FIG. 5 as the time required for executing the job. The calculated value may be stored in the storage unit 204 as the value of the job processing time field in the job management table shown in FIG. 5.

In addition, when the series of operations included in the measurement condition indicated by the recipe is executed, the control unit 208 may newly store the time to be taken for executing the series of operations in the storage unit 204 in association with the recipe. When the measurement condition indicated by the recipe is executed, the calculation unit 206 may further calculate the time to be taken until the execution of the job is completed, based on the time newly stored in the storage unit 204.

When a plurality of samples 128 are measured, different operations are performed on different samples 128 in parallel. Therefore, the time taken for executing all the operations included in one recipe and the total time taken for executing the operations included in the recipe are not always the same. The recipe processing time is an actual time taken when a plurality of operations are continuously executed. Therefore, it is possible to calculate a more accurate time than calculating the job processing time based on the individual operation processing times associated with the respective operations included in the recipe.

In addition, when the measurement condition indicated by the recipe including the VPD process is executed, the control unit 208 may store a time taken only for the VPD process in the storage unit 204. When the VPD process time is shorter than a measuring time, the calculation unit 206 may calculate the job processing time for the second and subsequent samples 128 without consideration being given to the VPD process time.

The display unit 120 is configured to display the time to be taken until the execution of the measurement condition indicated by the recipe is completed. Specifically, for example, the display unit 120 is a liquid crystal display or another such display device. The display unit 120 displays the value calculated by the calculation unit 206 when the user creates a recipe or a job.

Figure 7:
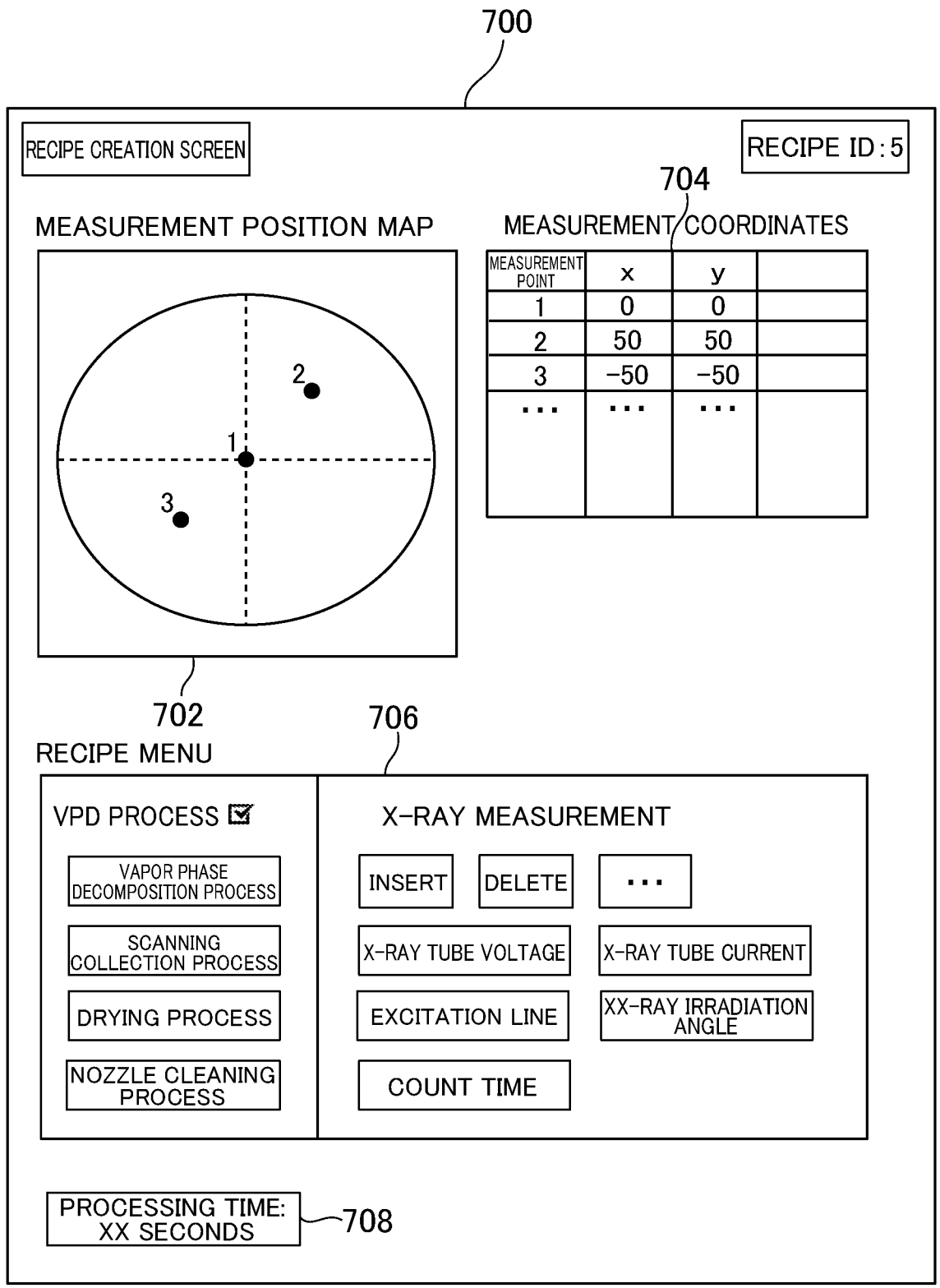
FIG. 7 is a diagram for illustrating an example of a recipe creation screen.

FIG. 7 is a diagram for illustrating the recipe creation screen 700. As illustrated in FIG. 7, the recipe creation screen 700 includes a measurement position map field 702, a measurement coordinate field 704, a recipe menu field 706, and a recipe processing time field 708. The user creates a recipe while viewing the recipe creation screen 700.

In the measurement position map field 702, a map showing positions to be measured on the sample 128 is displayed. Specifically, when the sample 128 is a circular substrate, a circle illustrated in FIG. 7 is displayed. The user designates a measurement position on the substrate by a method of, for example, moving a mouse pointer over the measurement position and clicking on the measurement position. In FIG. 7, as the measurement positions, the center of the substrate is designated for the first time, an upper right portion of the substrate is designated for the second time, and a lower left portion of the substrate is designated for the third time.

In the measurement coordinate field 704, the positions to be measured on the sample 128 are displayed in coordinates. Specifically, as illustrated in FIG. 7, the coordinates of the measurement points designated by the user are displayed in measurement order. The user may designate the measurement position by inputting a numerical value in the measurement coordinate field 704. In FIG. 7, a position having an x-coordinate of "0" and a y-coordinate of "0" is designated for the first time. A position having an x-coordinate of "50" and a y-coordinate of "50" is designated for the second time. A position having an x-coordinate of "−50" and a y-coordinate of "−50" is designated for the third time.

In the recipe menu field 706, each item relating to recipe creation is displayed. Specifically, for example, as illustrated in FIG. 7, a check box for determining whether or not to perform the VPD process is displayed. In addition, for example, a "vapor phase decomposition process" button, a "scanning collecting process" button, a "drying process" button, and a "nozzle cleaning process" button for setting conditions of the VPD process are displayed.

When the X-ray measurement is performed, an "insert" button for adding a measurement point and a "delete" button for deleting a currently-designated measurement point are also displayed in the recipe menu field 706. In addition, for example, an "X-ray tube voltage" button, an "X-ray tube current" button, an "excitation line (spectroscopic device selection) "button, an "X-ray irradiation angle" button, and a "count time", which are used for setting conditions for the X-ray measurement, are displayed.

In the recipe processing time field 708, the recipe processing time calculated based on the condition designated by the user is displayed. For example, the calculation unit 206 calculates the recipe processing time using the above-mentioned method. In the recipe processing time field 708, the calculated value is displayed as the recipe processing time. In the recipe processing time field 708, a value recalculated as required each time the user changes the condition is displayed. The time does not include a carry-in time and a carry-out time. Although not shown in FIG. 7, in the same manner as in FIG. 8, display for copying or saving the recipe, for example, may be performed.

Figure 8:
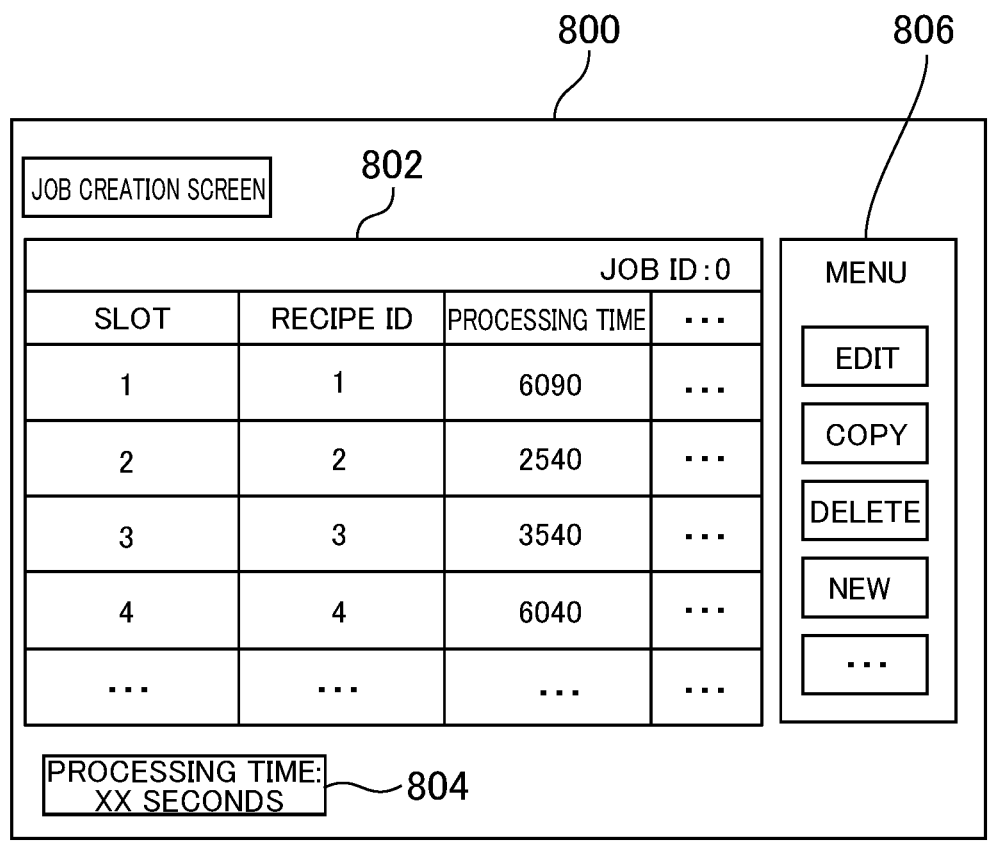
FIG. 8 is a diagram for illustrating an example of a job creation screen.

FIG. 8 is a diagram for illustrating the job creation screen 800. As illustrated in FIG. 8, the job creation screen 800 includes a job listing field 802, a job processing time field 804, and a job menu field 806. The user creates a job while viewing the job creation screen 800.

In the job listing field 802, jobs created by the user or being created by the user are displayed. Specifically, a job ID, a slot, a recipe ID, a processing time, and other such items are displayed.

The job ID is information for uniquely identifying the job being created by the user. The slot is a field indicating the slot number in which the sample 128 designated as the target to be measured is placed. The recipe ID is information for uniquely identifying the recipe created by the user. The processing time is the recipe processing time associated with the recipe ID.

The user creates a job by designating the slot number and recipe ID in the job listing field 802. Specifically, for example, the user designates the slot number of "1" and the recipe ID of "1" in association with the job ID of "0". In the same manner, the user designates a plurality of slot numbers and recipe IDs in measurement order. Thus, the job management table and the job table that are associated with the job ID of "0" are generated as shown in FIG. 5 and FIG. 6. The recipe processing time associated with the designated recipe ID is displayed in the processing time field.

In the job processing time field 804, the job processing time calculated based on the condition designated by the user is displayed. For example, in the case of the above-mentioned example, the calculation unit 206 calculates the job processing time shown in FIG. 5 or FIG. 6. The calculated value is displayed in the job processing time field 804. In the job processing time field 804, a value recalculated as required each time the user changes the condition is displayed.

In the job menu field 806, items relating to job creation is displayed. Specifically, as illustrated in FIG. 8, a "new" button for newly creating a job is displayed. An "edit" button for editing the already created job is displayed. A "copy" button for duplicating the already created job is displayed. A "delete" button for deleting the already created job is displayed.

When a job is newly created, the calculation unit 206 calculates the job processing time of the job. Specifically, when a job is newly generated, the control unit 208 calculates the time to be taken until the execution of the job is completed, for each job based on the time stored in the storage unit 204.

When the stored job is duplicated to generate a new job, the control unit 208 stores the time associated with the duplication source job in the storage unit 204 in association with the new job. Specifically, when the already created job is duplicated, the calculation unit 206 calculates the processing time associated with the duplication source job as a job processing time generated through duplication. For example, when the duplication source job processing time is "50000", the calculation unit 206 calculates the job processing time generated through duplication as "50000". The control unit 208 stores the calculated time in the storage unit 204.

The control unit 208 further evaluates a degree of modification when the duplicated job is modified, and performs, based on the evaluation, control as to whether a time obtained by adding correction corresponding to the modification to the time associated with the duplication source job is to be stored in the storage unit 204, or whether a time calculated based on the time stored in advance in association with each operation and details of the modified job is to be stored in the storage unit 204.

Specifically, the control unit 208 evaluates the number of modified operations among the operations included in the duplicated job. For example, when the number of modified operations included in the duplicated job is seven or smaller, which is a number set in advance, the calculation unit 206 calculates the processing time with correction corresponding to the modification. Meanwhile, when the number of modified operations among the operations included in the duplicated job exceeds seven, the calculation unit 206 calculates the processing time based on each individual time stored in advance in association with each operation and details of the modified job.

For example, description is given by taking a specific example in which the processing condition indicated by the duplication source job (job ID of "0") includes a VPD process and a modification of deleting the VPD process from the processing condition indicated by the duplicated job (job ID of "1") has been performed. Further, it is assumed that the job processing time associated with the duplication source job is "50000".

The user clicks the "copy" button on the job creation screen 800 illustrated in FIG. 8, to thereby create a job indicated by the job ID of "1" by using the job indicated by the job ID of "0" as the duplication source job. At this point in time, the calculation unit 206 calculates the job processing time generated through duplication as "50000".

Subsequently, the user changes the recipe ID included in the job indicated by the job ID of "1" from "0" to "1" on the job creation screen 800 illustrated in FIG. 8. In this case, the recipe indicated by the recipe ID of "0" and the recipe indicated by the recipe ID of "1" are different only in that the former includes the operation relating to the VPD process and the latter does not include an operation relating to the VPD process. In this case, the job indicated by the job ID of "1" is a job in which the operations indicated by the operation IDs of "2", "4", and "9" to "12" have been deleted from the job indicated by the job ID of "0" and the operation indicated by the operation ID of "1" has been added to the job indicated by the job ID of "0".

In the above-mentioned process of modification, the number of modified operations is seven. Therefore, the calculation unit 206 calculates the job processing time by subtracting the operation processing times associated with the operation IDs of "2", "4" and "9" to "12" from a processing time of "50000" associated with the job ID of "0". The calculation unit 206 further calculates the job processing time by adding the operation processing time of the operation indicated by the operation ID of "1" to the processing time. The control unit 208 stores the job processing time in the storage unit 204 in association with the job ID of "1".

Meanwhile, when the number of modified operations exceeds seven, the calculation unit 206 calculates the processing time based on the recipe processing time shown in FIG. 4 and each operation included in the modified job. This calculation method is the same as the calculation method when a new job is created.

Criteria for changing the calculation method are not limited to the above-mentioned method. For example, when only the coordinates of the measurement point or the slot number in which the sample 128 is placed is changed, it may be evaluated that the operation has not been changed. The above-mentioned calculation of the job processing time based on the degree of modification enables the calculation of an accurate job processing time closer to the actual value.

Figure 9:
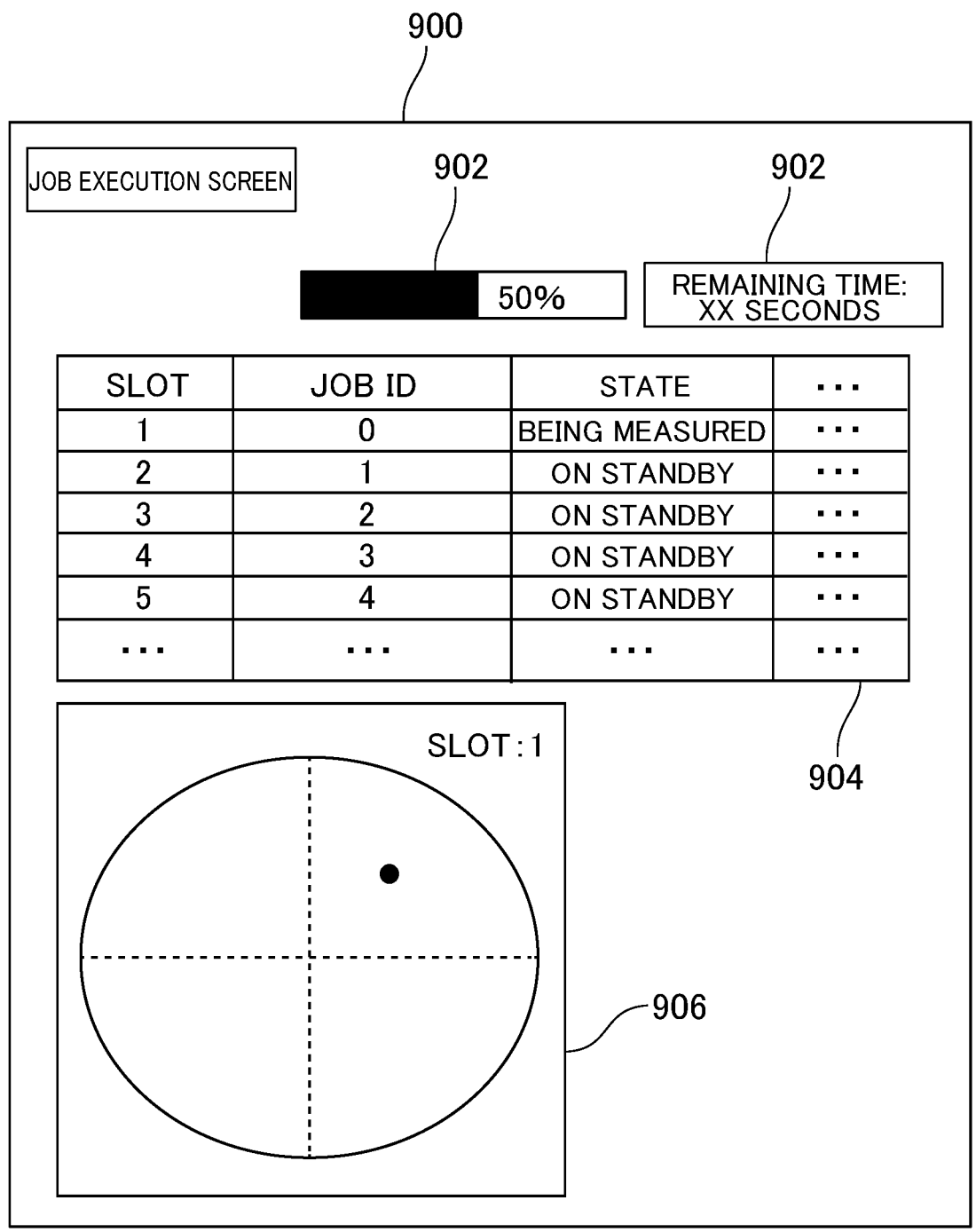
FIG. 9 is a diagram for illustrating an example of a job execution screen.

Next, execution of a job will be described. FIG. 9 is a diagram for illustrating a job execution screen 900. As illustrated in FIG. 9, the job execution screen 900 includes a remaining time field 902, a sample state field 904, and a measurement state field 906.

In the remaining time field 902, a remaining time of the time required for processing a job being executed is displayed. Specifically, the calculation unit 206 calculates, each time each operation included in the job is executed, a time obtained by subtracting the processing time of the operation for which the process is completed from the job processing time. In the remaining time field 902, the calculated time is displayed. In the remaining time field 902, as illustrated in FIG. 9, a ratio of the remaining time to the entire job processing time may be displayed in the form of a bar, or the calculated remaining time may be displayed in the form of a numerical value.

In the sample state field 904, a state of the sample 128 placed in each slot is displayed. Specifically, in the sample state field 904, for example, the job ID of the job being executed and the state of the sample 128 are displayed for each sample 128 placed in the slot. The state of the sample 128 is, for example, a state of being measured by the measuring unit 114 or a state in which the sample 128 is on standby.

In the measurement state field 906, the position at which the measurement is being performed is displayed when the sample 128 is being measured. Specifically, as illustrated in FIG. 9, it is displayed that the measurement is being performed at the position having the x-coordinate of "50" and the y-coordinate of "50".

Next, a series of operations performed when the job associated with the job ID of "0" shown in FIG. 6 is executed will be described. First, the sample 128 placed in the slot 1 of the carrier placed in the sample storage device 102 is conveyed to the aligner unit 110 ("1" in No. field). The sample 128 is subjected to position alignment processing by the aligner unit 110.

Subsequently, the conveying device 104 conveys the sample 128 from the aligner unit 110 to the VPD unit 112 ("2" in No. field). The VPD unit 112 sequentially performs the vapor phase decomposition process, the scanning collecting process, the drying process, and the nozzle cleaning process ("3 to 6" in No. fields).

Subsequently, the conveying device 104 conveys the sample 128 from the VPD unit 112 to the load lock unit 108 ("7" in No. field). The inside of the load lock unit 108 is evacuated while the sample 128 is placed inside the load lock unit 108. After the inside of the load lock unit 108 is evacuated, the sample 128 is conveyed to the measuring unit 114 ("8" in No. field).

Subsequently, the X-ray source 122 placed in the measuring unit 114 is powered on ("9" in No. field). The power applied to the X-ray source 122 is stepwise increased to a set value, and aging is performed until the emitted primary X-rays are stabilized ("10" in No. field).

The X-ray measurement is performed after a time for aging has elapsed ("11" in No. field). This step includes a step of moving, using the sample stage 124, the sample 128 so that the measurement position (x-coordinate of "0" and y-coordinate of "0") on the sample 128 becomes an irradiation position of the primary X-rays, measurement for correcting the irradiation angle at the measurement position through use of the intensity at the center position, and measurement for obtaining actual data.

After that, the samples 128 placed in a plurality of slots are subjected to the conveyance, the VPD process, and the X-ray measurement. After the X-ray measurement is performed on the last sample 128, the power applied to the X-ray source 122 is stepwise reduced ("27" in No. field). After the power applied to the X-ray source 122 has been sufficiently reduced, the X-ray source 122 is powered off ("28" in No. field).

Subsequently, the sample 128 is conveyed from the measuring unit 114 to the load lock unit 108 ("29" in No. field). This step includes a step of bringing the inside of the load lock to atmospheric pressure while the sample 128 is placed inside the load lock. The conveying device 104 further conveys the sample 128 from the load lock unit 108 to the slot 1 of the carrier arranged in the sample storage device 102 ("30" in No. field).

Every time each of the above-mentioned steps is executed, or every predetermined time, the calculation unit 206 calculates the remaining time of the time required for processing the job being executed. In the remaining time field 902, the calculated remaining time is displayed. This allows the user to confirm progress of the recipe and the time to be taken until the recipe is completed. When the X-ray fluorescence spectrometric system 100 and other apparatus are combined to form one system, the X-ray fluorescence spectrometric system 100 notifies the other apparatus of the remaining time, to thereby be able to reduce the waiting time of the other apparatuses.

The present invention has been described through use of the VPD-integrated total reflection X-ray fluorescence spectrometer, but a general wavelength-dispersive X-ray fluorescence spectrometer may be used, for example. Further, the present invention is not limited to the above-mentioned examples or modification examples, and various modifications are possible. The above-mentioned configurations and jobs are merely examples, and the present invention is not limited thereto. The configuration described in the above-mentioned example may be replaced by substantially the same configuration, or by a configuration that produces the same action and effect or a configuration that achieves the same object. For example, the operation table, the recipe table, the job table, the recipe creation screen 700, the job creation screen 800, and the job execution screen 900 that have been described above are merely examples, and may be replaced by components that achieve the same object.

REFERENCE SIGNS LIST

100 X-ray fluorescence spectrometric system, 102 sample storage device, 104 conveying device, 106 X-ray fluorescence spectrometer, 108 load lock unit, 110 aligner unit 112 VPD unit, 114 measuring unit, 116 shutter, 118 information processing unit, 120 display unit, 122 X-ray source, 124 sample stage, 126 detector, 128 sample, 202 job execution unit, 204 storage unit, 206 calculation unit, 208 control unit, 700 recipe creation screen, 702 measurement position map field, 704 measurement coordinate field, 706 recipe menu field, 708 recipe processing time field, 800 job creation screen, 802 job listing field, 804 job processing time field, 806 job menu field, 900 job execution screen, 902 remaining time field, 904 sample state field, 906 measurement state field

The invention claimed is:

1. An X-ray fluorescence spectrometric system, which is configured to analyze a sample through use of fluorescent X-rays generated by irradiating a surface of the sample with primary X-rays, the X-ray fluorescence spectrometric system comprising:

a job execution unit configured to execute a job indicating a processing condition in which a recipe indicating a measurement condition formed by combining a plurality of operations required for the analysis and the sample to be measured under the measurement condition indicated by the recipe are associated with each other;

a storage unit configured to store in advance a time required for each of the operations in association with the each of the operations;

a calculation unit configured to calculate, when the job is generated, a time to be taken until execution of the job is completed, for each job based on the time stored in the storage unit; and a control unit configured to newly store, when the job is executed, a time taken for the operation in the storage unit, in association with the operation, wherein the calculation unit is configured to further calculate, when the job is executed, the time to be taken until the execution of the job is completed, based on the time newly stored in the storage unit.

2. The X-ray fluorescence spectrometric system according to claim 1, wherein the storage unit is configured to store in advance a time required for executing a series of operations included in the measurement condition indicated by the recipe in association with the recipe, wherein the calculation unit is configured to calculate, when the job is generated, the time to be taken until the execution of the job is completed, for each job based on the time stored in advance in association with the recipe, wherein the control unit is configured to newly store, when the series of operations included in the measurement condition indicated by the recipe are executed, the time to be taken for executing the series of operations in the storage unit in association with the recipe, and wherein the calculation unit is configured to further calculate, when the measurement condition indicated by the recipe is executed, the time to be taken until the execution of the job is completed, based on the time newly stored in the storage unit.

3. The X-ray fluorescence spectrometric system according to claim 2, wherein the job includes one or a plurality of jobs stored in the storage unit, and wherein the control unit is configured to store, when the stored job is duplicated to generate a new job, the time associated with the job being a duplication source, in the storage unit in association with the new job.

4. The X-ray fluorescence spectrometric system according to claim 3, wherein the control unit is configured to further evaluate, when the duplicated job is modified, a degree of modification, and perform, based on the evaluation, control as to whether a time obtained by adding correction corresponding to the modification to the time associated with the job being the duplication source is to be stored in the storage unit, or whether a time calculated based on the time stored in advance in association with the recipe and details of the modified job is to be stored in the storage unit.

5. The X-ray fluorescence spectrometric system according to claim 1, wherein the calculation unit is configured to calculate the time to be taken until the execution of the job is completed, based on a median value of a plurality of times stored most recently in the storage unit.

6. The X-ray fluorescence spectrometric system according to claim 1, wherein the calculation unit is configured to calculate the time to be taken until the execution of the job is completed, based on an average value of a plurality of times stored most recently in the storage unit.

7. The X-ray fluorescence spectrometric system according to claim 1, further comprising a display unit configured to display the time to be taken until the execution of the job is completed.

* * * * *